(12) United States Patent
Mruk et al.

(10) Patent No.: US 8,536,264 B2
(45) Date of Patent: Sep. 17, 2013

(54) PNEUMATIC TIRE AND RUBBER COMPOSITION CONTAINING TWIN POLYMERIZATION STRUCTURES

(75) Inventors: Ralf Mruk, Lipperscheid (LU); Frank Schmitz, Bissen (LU); Liqing Ma, Fairlawn, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 453 days.

(21) Appl. No.: 13/048,920

(22) Filed: Mar. 16, 2011

(65) Prior Publication Data

US 2011/0240197 A1   Oct. 6, 2011

Related U.S. Application Data

(60) Provisional application No. 61/320,393, filed on Apr. 2, 2010.

(51) Int. Cl.
*C08L 9/00* (2006.01)

(52) U.S. Cl.
USPC ............... 524/502; 524/35; 524/47; 524/528; 152/525; 152/564; 525/342; 525/337

(58) Field of Classification Search
USPC ............... 524/502, 528; 152/525; 525/342, 525/337
See application file for complete search history.

(56) References Cited

U.S. PATENT DOCUMENTS

| 2,276,094 A | 3/1942 | Rothrock | 260/80 |
| 6,524,716 B2 | 2/2003 | Visel et al. | 428/447 |
| 2004/0082702 A1* | 4/2004 | Sandstrom | 524/492 |

FOREIGN PATENT DOCUMENTS

| WO | 2009/083083 A1 | 7/2009 |
| WO | 2010/112581 A1 | 10/2010 |
| WO | 2010/128144 A1 | 11/2010 |

OTHER PUBLICATIONS

European Search Report, dated Aug. 9, 2011.
Vol. 12, pp. 1671-1681, Journal of Applied Polymer Science, "An Investigation of the Polymerization of Furfuryl Alcohol with Gel Permeation Chromatography" (1968).
Vol. 46, pp. 628-632, Wiley InterScience, Grund et al., "Nanocomposites Prepared by Twin Polymerization of a Single-Source Monomer" (2007).
Vol. 20, pp. 4113-4117, Wiley InterScience, Mehner, et al., "Synthesis of Nanosized $TiO_2$ by Cationic Polymerization of ($\mu_4$-oxido)-Hexakis ($\mu$-furfuryloxo)-octakis(furfuryloxo)-tetra-titanium." Advanced Materials 2008.
Vol. 21, pp. 2111-2116, Wiley InterScience, Spange, et al., "Nanostructured Organic-Inorganic Composite Materials by Twin Polymerization of Hybrid Monomers," Advanced Materials 2009.
Vol. 48, pp. 8878-8881, Wiley InterScience, Bottger-Hiller, et al., "Nanoscale TungstenTrioxide Synthesized by In Situ Twin Polymerization," Angew. Chem, Int. Ed. 2009.

* cited by examiner

*Primary Examiner* — Ling Choi
*Assistant Examiner* — Wenwen Cai
(74) *Attorney, Agent, or Firm* — John D. DeLong

(57) ABSTRACT

The present invention is directed to a pneumatic tire comprising a component, the component comprising a rubber composition comprising a diene based elastomer and 1 to 100 phr of:

A) a twin polymerization reaction product of a silyl ether; or
B) a twin polymerization reaction product of a boronic acid ester; or
C) a twin polymerization reaction product of a titanium compound derived from tetraethyl orthotitanate and furfuryl alcohol; or
D) a twin polymerization reaction product of a tungsten compound;

The invention is further directed to the corresponding rubber compositions.

20 Claims, 8 Drawing Sheets

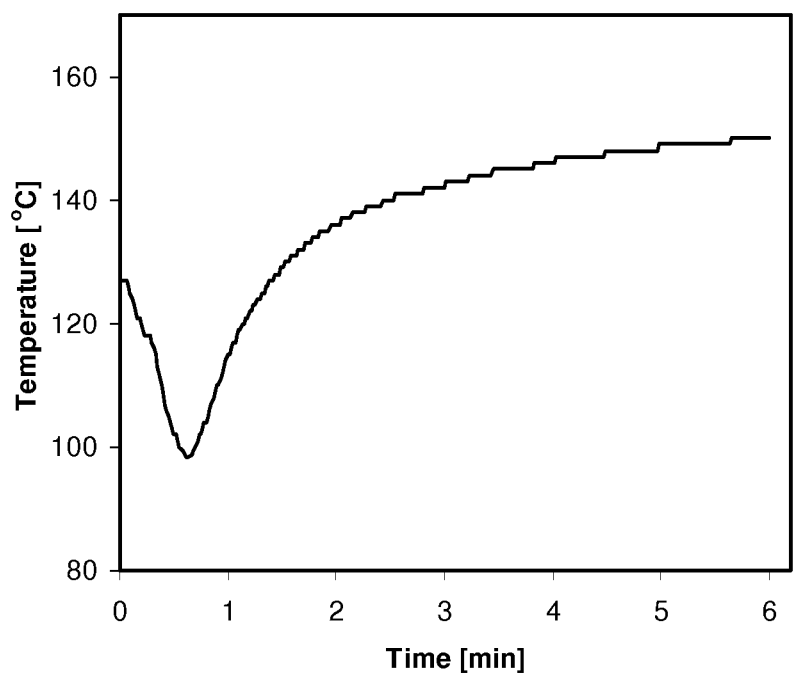
Figure 1-A
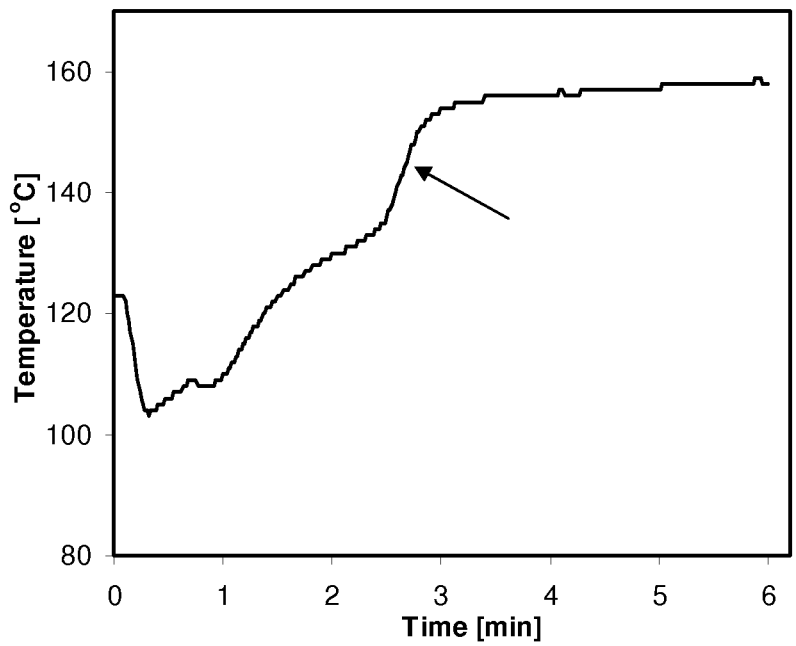
Figure 1-B

PNEUMATIC TIRE AND RUBBER COMPOSITION CONTAINING TWIN POLYMERIZATION STRUCTURES

CROSS REFERENCE TO OTHER APPLICATIONS

This application claims the benefit of and incorporates by reference U.S. Provisional Application No. 61/320,393, filed Apr. 2, 2010.

BACKGROUND OF THE INVENTION

Twin polymerization is a polymerization process which creates two different polymer structures from one monomer. The concept of twin polymerization has been investigated by Spange et al. (see for example, *Advanced Materials* 2009, 21, 2111-2116; *Angewandte Chemie International Edition* 2007, 46, 628-632; *Angewandte Chemie International Edition* 2009, 48, 8878-8881). Examples for monomers undergoing twin polymerization are silyl ethers of furfuryl alcohol and 2-hydroxymethyl phenol:

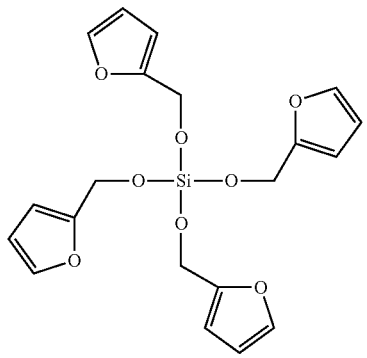

Tetrafurfuryloxy silane
(tetrafurfuryl orthosilicate, TFOS)

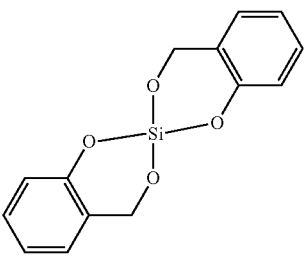

silyl ether of 2-hydroxymethyl phenol
(2,2'-spirobi[4H-1,2,3-benzodioxasiline],SBOS)

The scission of the silyl ether bonds of the sketched monomers and further polymerization and/or polycondensation reactions lead to an interpenetrating network of silicon dioxide and an organic polymer. In the first case, a furfuryl alcohol resin will be formed from the organic moieties of the component as the polymerization of furfuryl alcohol usually leads to crosslinking by side reactions. In case of the second monomer, a phenol-formaldehyde resin can be formed from the organic part of the molecule.

The twin polymerization reaction of tetrafurfuryloxy silane is shown as follows:

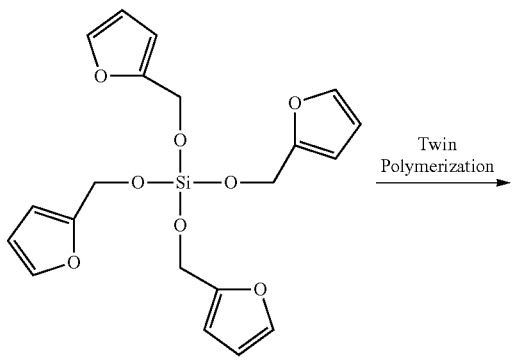

-continued

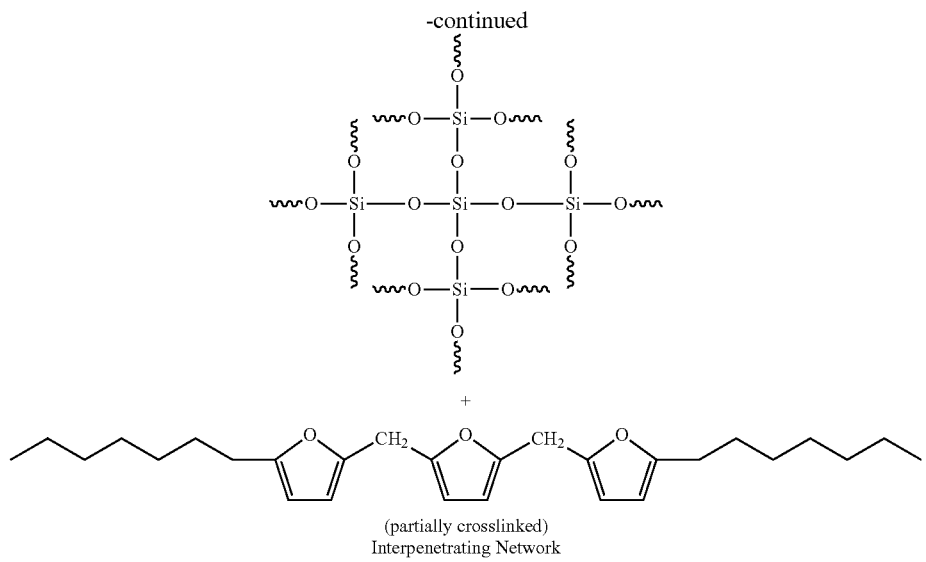

(partially crosslinked)
Interpenetrating Network

SUMMARY OF THE INVENTION

The present invention is directed to a pneumatic tire comprising a component, the component comprising a rubber composition comprising a diene based elastomer and 1 to 100 phr of:

A) a twin polymerization reaction product of a silyl ether, wherein the silyl ethers are of the following structures I or II:

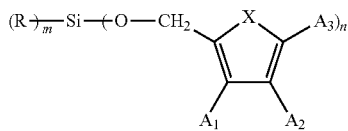

I wherein m=0, 1, or 2; n=4-m; R=aliphatic or heteroaliphatic moieties (alkyl, alkoxy etc.); X=oxygen or sulfur; A1, A2, A3=independently from each other H, or alkyl;

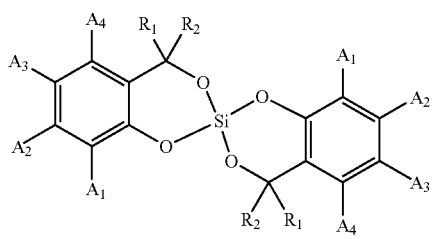

II wherein R1, R2=independently from each other hydrogen, alkyl up to 6 carbons; A1, A2, A3, A4=independently from each other hydrogen, unbranched or branched aliphatic hydrocarbons, aromatic hydrocarbons or aromatic-aliphatic hydrocarbons; or B) a twin polymerization reaction product of a boronic acid esters as shown in formula V:

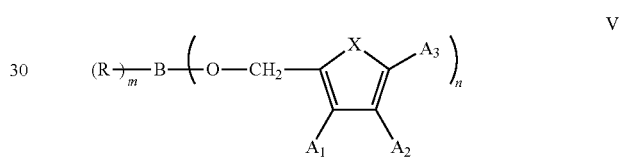

V wherein m=0 or 1; n=3-m; R=aliphatic or heteroaliphatic moieties (alkyl, alkoxy etc.); X=oxygen or sulfur; A1, A2, A3=independently from each other H, alkyl; or C) a twin polymerization reaction product of a titanium compound derived from tetraethyl orthotitanate and furfuryl alcohol; or D) a twin polymerization reaction product of a tungsten compound derived from tungsten hexachloride and furfuryl acetate, thiophene-2-methanol, p-methoxybenzylalcohol or o-methoxybenzylalcohol

BRIEF DESCRIPTION OF THE DRAWINGS

FIGS. 1-A and 1-B show graphs of temperature versus time for the mixing of two rubber samples.

DESCRIPTION OF THE INVENTION

Figure 2:
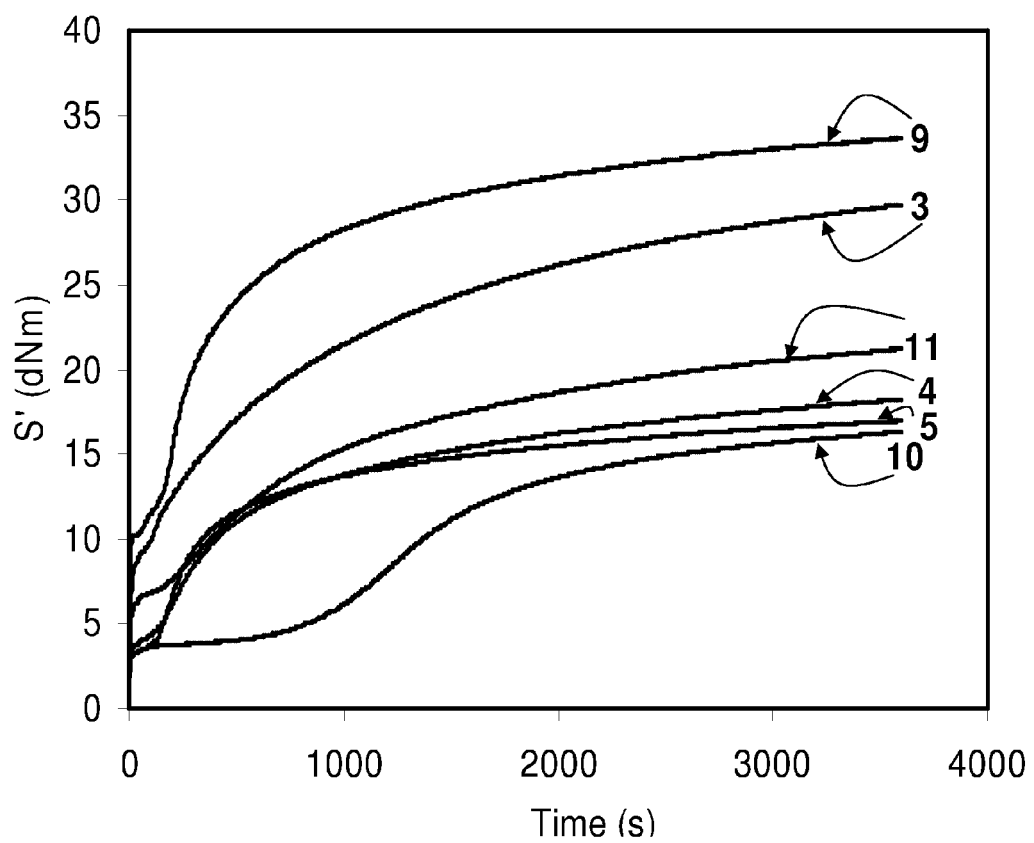
FIG. 2 shows a graph of torque versus cure time for several rubber samples.
Figure 3:
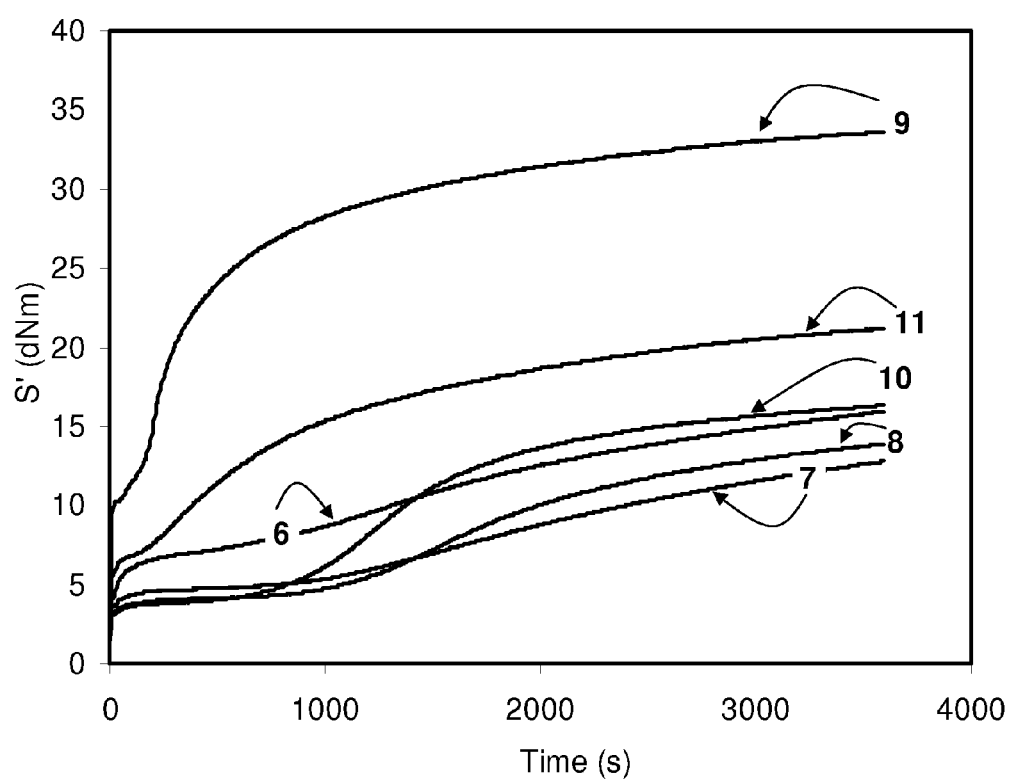
FIG. 3 shows a graph of torque versus cure time for several rubber samples.

The present invention is directed to the use of monomers which can undergo twin polymerization in tire compounds to form a reaction product of the monomers. The main goal of the use of these materials is the improvement of polymer-filler interactions. For example, twin polymerizable monomers may be added as full or partial replacement or in addition to silanes which are currently needed to assure a high level of polymer-filler-interactions when polar fillers like silica, cellulose, starch or short fibers are used. Alternatively, materials derived from twin polymerization can also be used as fillers by themselves partially or fully replacing fillers such as carbon black or silica.

The present invention is also directed to a pneumatic tire comprising a component, the component comprising a rubber composition comprising a diene based elastomer and 1 to 100 phr of a reaction product of a silyl ether, wherein the silyl ethers are of the following structures I or II:

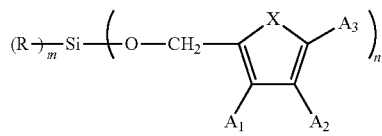

I wherein m=0, 1, or 2; n=4-m; R=aliphatic or heteroaliphatic moieties (alkyl, alkoxy etc.); X=oxygen or sulfur; A1, A2, A3=independently from each other H, or alkyl;

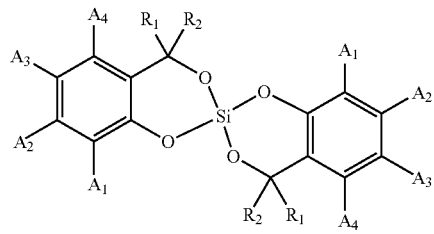

II wherein R1, R2=independently from each other hydrogen, alkyl up to 6 carbons; A1, A2, A3, A4=independently from each other hydrogen, unbranched or branched aliphatic hydrocarbons, aromatic hydrocarbons or aromatic-aliphatic hydrocarbons.

In one embodiment, exemplary silyl ethers are silyl ethers of furfuryl alcohol and 2-hydroxymethyl phenol having the following structures III and IV:

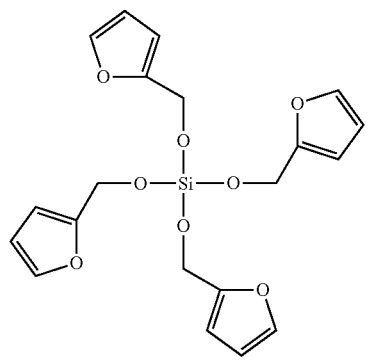

III

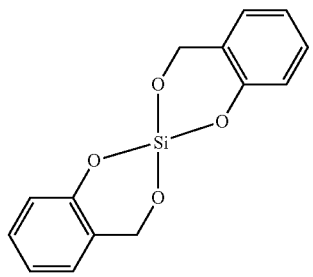

IV

The present invention is further directed to the rubber compositions.

The reaction product resulting from twin polymerization of silyl ether may be used in the rubber composition and tire as a partial or complete replacement for conventional fillers.

While not wishing to be bound by any theory, it is believed that due to their relatively high polarity compared to the surrounding polymer matrix it is likely that the monomers migrate to the filler surface during the mixing process. When the twin polymerization starts at the surface of the filler particles, a reaction product such as an interpenetrating network consisting of silicon dioxide and an organic resin is formed. In the case of silica filler particles, strong interactions of the formed silicon dioxide and the filler particles leading to the incorporation of the newly formed silica into the filler particles can be expected. As the organic resin forms an interpenetrating network with the freshly formed silicon dioxide, strong interactions between the resin and the filler particles can also be expected.

It is believed that the interpenetrating network forms a transition phase on the particle surface. This phase provides a high level of adhesion between the silica particles and the polymer matrix. In addition, the interpenetrating phase exhibits an intermediate modulus between the high modulus filler particles and the low modulus polymer matrix. The modulus gradient leads to an improved force transfer between filler particles and polymer matrix which is likely to improve the mechanical properties of the compound.

It might be desirable that the coupling of the interpenetrating network to the elastomer does not proceed before the curing process in order to guarantee good processing during mixing and extrusion. The extent of the coupling already taking place during the mixing process might be influenced by the modification of the maximum mixing temperature or other parameters. An incomplete scission of the silyl ether groups might be desirable to further enhance the interactions between resin and silicon dioxide by covalent silyl ether bonds. An acidic catalyst might be required to induce the twin polymerization or to increase the reaction rate to a reasonable level. As catalysts stearic acid or zinc compounds such as zinc stearate which are often used in rubber formulations might be used. In the case that more effective catalysts would be required, stronger organic acids for example p-alkylbenzene-sulfonic acids might be added. To avoid issues during the cure reaction, an additional amount of a base can be added at a later mixing stage to neutralize remaining acidic catalyst.

Alternatively the twin polymerization process could be performed during a pretreatment of the silica prior to mixing. This could be performed by adsorption of the monomer on the silica in liquid phase with subsequent acid treatment to induce the twin polymerization on the silica surface. The solvent could then be removed and the pretreated silica could be neutralized and used for the compound preparation in an internal mixer.

The interaction of the organic resin with the polymer matrix may proceed in several ways. For example, addition of supplementary resin components such as resorcinol or resorcinol-formaldehyde-precondensates and methylene sources like hexamethylene tetraamine (HMTA) to the compound could lead to a crosslinking of the resin network formed on the surface of the filler particles with the resin network present in the polymer matrix. Moreover, the addition of methylene sources may positively influence the stability of a phenol-formaldehyde resin which is formed by the twin polymerization when the silyl ether of 2-hydroxymethyl phenol is used. As the phenol-formaldehyde ratio in this system is fixed to 1:1, no crosslinking can occur when no other components are added (except via silyl ethers, if the hydrolysis is incomplete). The addition of methylene donors would shift the phenol-formaldehyde ratio thus allowing the formation of crosslinks within the resin.

When tetrafurfuryloxy silane is used, the resulting furfuryl alcohol resins might be covulcanized with the polymer matrix. Furfuryl alcohol resins feature allylic hydrogens which might undergo vulcanization reactions (indicated by the arrow in the following, note that the aromatic behavior of furans is much less pronounced than that of benzene).

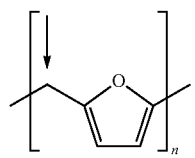

In addition the furfuryl moieties of the partially condensed silane or of furfuryl alcohol resins may react with activated dienophiles in a Diels-Alder reaction as visualized by the following scheme. Activated dienophiles which could be used for this type of reaction include bismaleimides such as N,N'-(m-phenylene)bismaleimide and derivatives thereof, and biscitraconimides such as 1,3-bis(citraconimidomethyl) benzene and derivatives thereof:

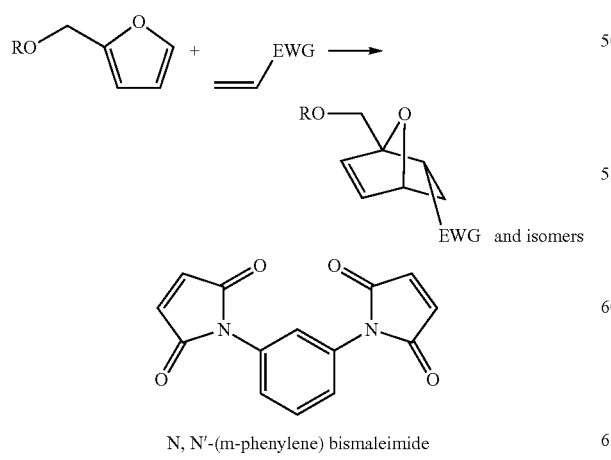

N, N'-(m-phenylene) bismaleimide

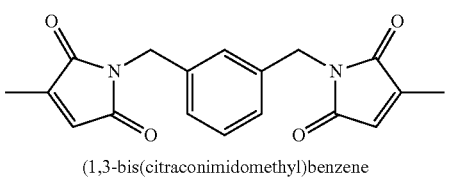

(1,3-bis(citraconimidomethyl)benzene

EWG = electron withdrawing group

This reaction could be used to link silanes which have partially condensed on the filler surface with conjugated dienes in elastomer chains. This type of linkage could further enhance polymer-filler interactions as seen in following scheme:

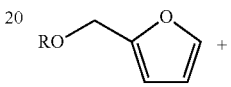

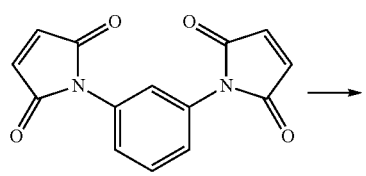

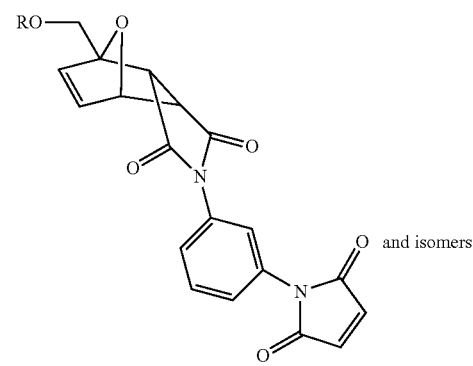

and isomers

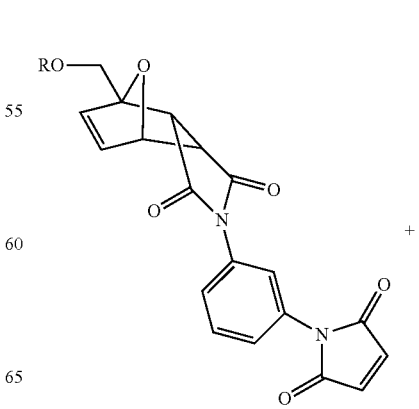

+

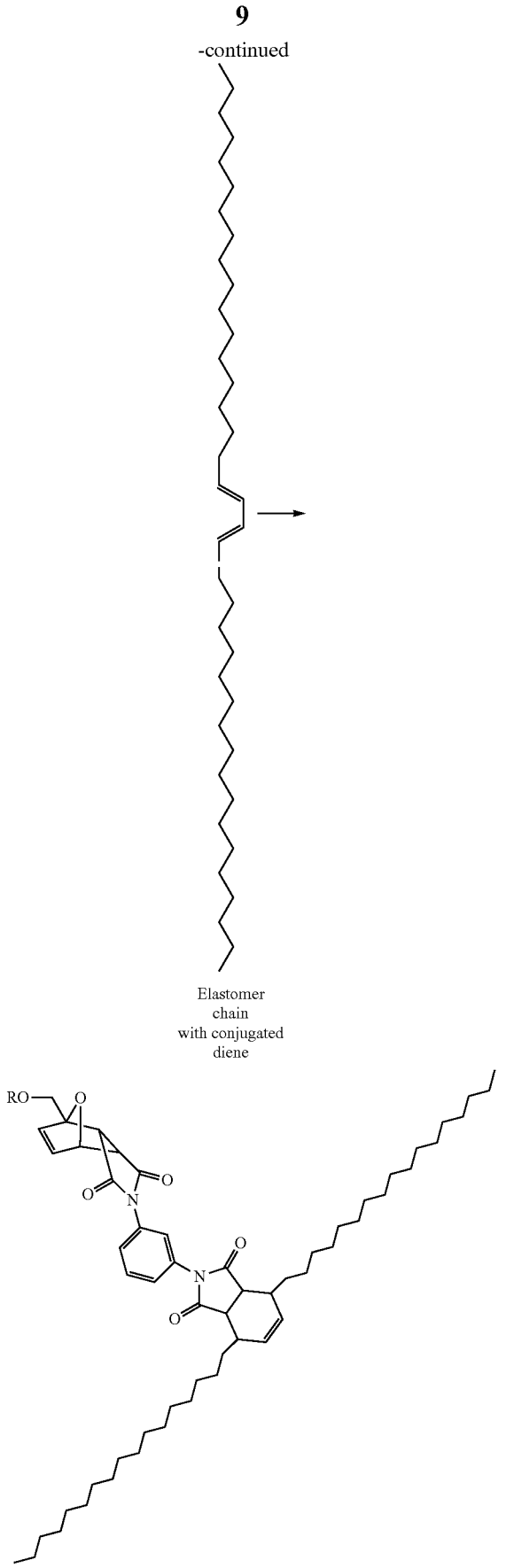

Elastomer chain with conjugated diene

The rubber composition then includes the reaction product of a silyl ether. In one embodiment, the silyl ether is tetrafurfuryloxy silane or a silyl ether of 2-hydroxymethyl phenol. In one embodiment the silyl ether is a silyl ether of formula I or formula II, as given above.

The rubber composition includes a sufficient amount of the silyl ether to effect a reinforcing effect on the cured rubber composition. In one embodiment, the amount of silyl ether in the rubber composition ranges from 1 to 100 phr. In one embodiment, the amount of silyl ether in the rubber composition ranges from 1 to 20 phr.

The rubber composition may further include an activated dienophile. In one embodiment, the activated dienophile includes bismaleimides and biscitraconimides. In one embodiment, the activated dienophile includes N,N'-(m-phenylene)bismaleimide and 1,3-bis(citraconimidomethyl)benzene.

In one embodiment, the amount of activated dienophile ranges from 1 to 10 phr.

Alternatively to the use as coupling agent at the surface of polar fillers such as silica the reaction product obtained by twin polymerization can also be used as filler by themselves partially replacing carbon black or silica. For this purpose, the respective monomer of formula I or II can be directly added to the compound formulation during mixing and the twin polymerization can be performed during mixing for example by addition of an acidic catalyst as described above.

Alternatively, a reaction product obtained by twin-polymerization in a preceding step can be added to an internal mixer during compound mixing. In this case, the particle size of the composite particles has to be in the low micron or sub-micron range to allow a reinforcement of the compound formulation by the filler. In the case of the use of materials derived from twin polymerization as alternate fillers, the amount of silyl ethers or the respective reaction product added to the compound formulation ranges from 5 to 100 phr.

Alternatively to the composite materials based on the silyl ethers described in formulas I and II, the use of composites based on the twin polymerization of boron, titanium and tungsten containing monomers as rubber compound ingredients are also an aspect of this invention. These materials can be used as fillers and added to compound formulations in ranges from 5 to 100 phr.

The general structure of boronic acid esters that can be used for this purpose is shown in formula V:

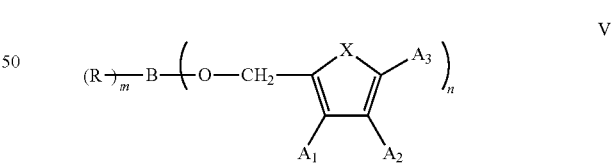

wherein m=0 or 1; n=3-m; R=aliphatic or heteroaliphatic moieties (alkyl, alkoxy etc.); X=oxygen or sulfur; A1, A2, A3=independently from each other H, alkyl.

The twin polymerization of these compounds will lead to composites of diboron trioxide and an organic resin.

Composites based on titanium dioxide and a furfuryl alcohol resin which can be used as fillers can for example be obtained by the twin polymerization of titanium compounds derived from tetraethyl orthotitanate and furfuryl alcohol (see for example, Mehner et al, Adv. Mater, 2008, 20, 4113-4117).

Composites based on tungsten trioxide and organic resins which can be used as fillers can for example be obtained by reaction of tungsten hexachloride with furfuryl acetate, thiophene-2-methanol, p-methoxybenzylalcohol or o-methoxybenzylalcohol (see for example, Bottger-Hiller et al, Angew. Chem. Int. Ed., 2009, 48, 8878-8881).

The rubber composition includes at least one diene based rubber or diene based elastomer. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene(polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are natural rubber, synthetic polyisoprene, polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

In one embodiment, cis 1,4-polybutadiene rubber (BR) is used. Suitable polybutadiene rubbers may be prepared, for example, by organic solution polymerization of 1,3-butadiene. The BR may be conveniently characterized, for example, by having at least a 90 percent cis 1,4-content and a glass transition temperature Tg in a range of from −95 to −105° C. Suitable polybutadiene rubbers are available commercially, such as Budene® 1207 from Goodyear and the like.

In one embodiment, a synthetic or natural polyisoprene rubber may be used.

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 30 to 120 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488; plasticized starch composite filler including but not limited to that disclosed in U.S. Pat. No. 5,672,6391; cellulose, and short textile fibers such as polyester, polyketone, polyaramid, rayon, or nylon with a length of from 1 to 10 mm. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

Z-Alk-S$_n$-Alk-Z          VI in which Z is selected from the group consisting of

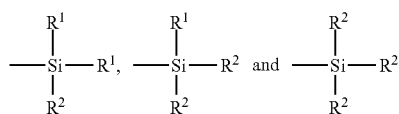

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl)polysulfides. In one embodiment, the sulfur containing organosilicon compounds are 3,3'-bis(triethoxysilylpropyl) disulfide and/or 3,3'-bis(triethoxysilylpropyl)tetrasulfide. Therefore, as to formula VI, Z may be

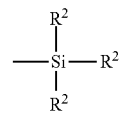

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), carcass, sidewall, apex, chafer, sidewall insert, wirecoat or innerliner. In one embodiment, the component is a tread.

In the case of components such as a carcass, the rubber composition may be in contact with reinforcing tire cords constructed from conventional materials including polyester, nylon, and rayon. So contacted, the presence of the reaction product of twin polymerization may enhance adhesion of the rubber composition to the tire cords.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting examples.

Example 1

In this example, the in situ reaction of a silyl ether in a rubber sample is illustrated. Two rubber samples were mixed according to the composition in Table 1, with all amounts given in phr. Sample 1 served as control. Sample 2 included a silyl ether (TFOS) and acid polymerization initiator p-toluenesulfonic acid. In the case of sample 2, the addition of p-toluenesulfonic acid was delayed until 2 minutes after start of mixing. The mixing of the non-productive stage was monitored using the thermocouple embedded in the chamber of the mixer to measure the temperature (° C.) with time. The results are shown in FIG. 1.

TABLE 1

| Sample No. | 1 | 2 |
|---|---|---|
| Styrene-butadiene rubber | 100 | 100 |
| tetrafurfuryl orthosilicate (TFOS) | 0 | 10 |
| p-toluenesulfonic acid | 0 | 1 |

FIG. 1-A shows the graph of temperature versus time for control Sample 1, with the typical gradual increase in temperature due to heating and energy input from the mixer. In contrast, FIG. 1-B shows a rapid increase in temperature subsequent to the addition of p-toluenesulfonic acid in Sample 2 at 2 minutes as indicated by the arrow. The behavior in FIG. 1-B confirms the exothermic polymerization of TFOS in the rubber composition, whereas no such exotherm is seen in control Sample 1 (FIG. 1-A).

Example 2

In this example, polymerization of a silyl ether in the presence of silica (i.e., pretreatment of silica) is illustrated. Silica (200 grams) was dispersed in ethanol (800 grams), followed by addition of 0.5 weight percent (based on silica weight) of p-toluenesulfonic acid. After mixing the ethanol was removed by vacuum. The p-toluenesulfonic acid treated silica was then dispersed in toluene, followed by addition of 10 weight percent (based on silica weight) of tetrafurfuryl orthosilicate (TFOS) or 2,2'-spirobi[4H-1,2,3-benzodioxasiline] (SBOS). In the case of TFOS, the dispersed silica was then stirred at room temperature for 4 days followed by reflux for 1 hour. After cooling the solvent was filtered, the treated silica was washed three times with toluene and the remaining solvent was removed by drying in vacuum. In the case of SBOS, the dispersed silica was stirred at 80° C. for 16 hr. After cooling the solvent was filtered, the treated silica was washed three times with toluene and the remaining solvent was removed by drying in vacuum.

In the case of TFOS, the resulting treated silica particles showed a uniform gray-to-black color caused by the dark color of the resin component of the twin polymerization product. In both cases, no other particles besides the treated silica were visible in the filtrates which shows that the twin polymerization products cover in both cases the silica particle surfaces.

Example 3

In this example, the effect of using a pretreated silica in a rubber compound is illustrated. Pretreated silicas were prepared following the procedures of Example 2. A series of nine rubber compounds was prepared following the compositions given in Table 2, with all amounts in phr. Other additives were used in identical amounts including process oil, 20 phr; stearic acid, 2 phr; zinc oxide, 3.5 phr; N-cyclohexyl-2-benzothiazole sulfenamide, 1.6 phr; diphenyl guanidine, 1.2; sulfur, 1.8 phr. The rubber compounds were evaluated for viscoelastic properties using an MDR 2000 at 150° C. following ASTM D2084 and D5289. Results for torque S' and dynamic modulus G' versus time are given in FIGS. 2, 3, 4 and 5.

TABLE 2

| Sample No. | 3 | 4 | 5 | 6 | 7 | 8 | 9 | 10 | 11 |
|---|---|---|---|---|---|---|---|---|---|
| SBR | 100 | 100 | 100 | 100 | 100 | 100 | 100 | 100 | 100 |
| TFOS-Si[1] | 71.5 | 71.5 | 71.5 | 0 | 0 | 0 | 0 | 0 | 0 |
| SBOS-Si[2] | 0 | 0 | 0 | 71.5 | 71.5 | 71.5 | 0 | 0 | 0 |
| Silica | 0 | 0 | 0 | 0 | 0 | 0 | 65 | 65 | 65 |
| Silane[3] | 0 | 2.6 | 5.2 | 0 | 2.6 | 5.2 | 0 | 2.6 | 5.2 |

Figure 4:
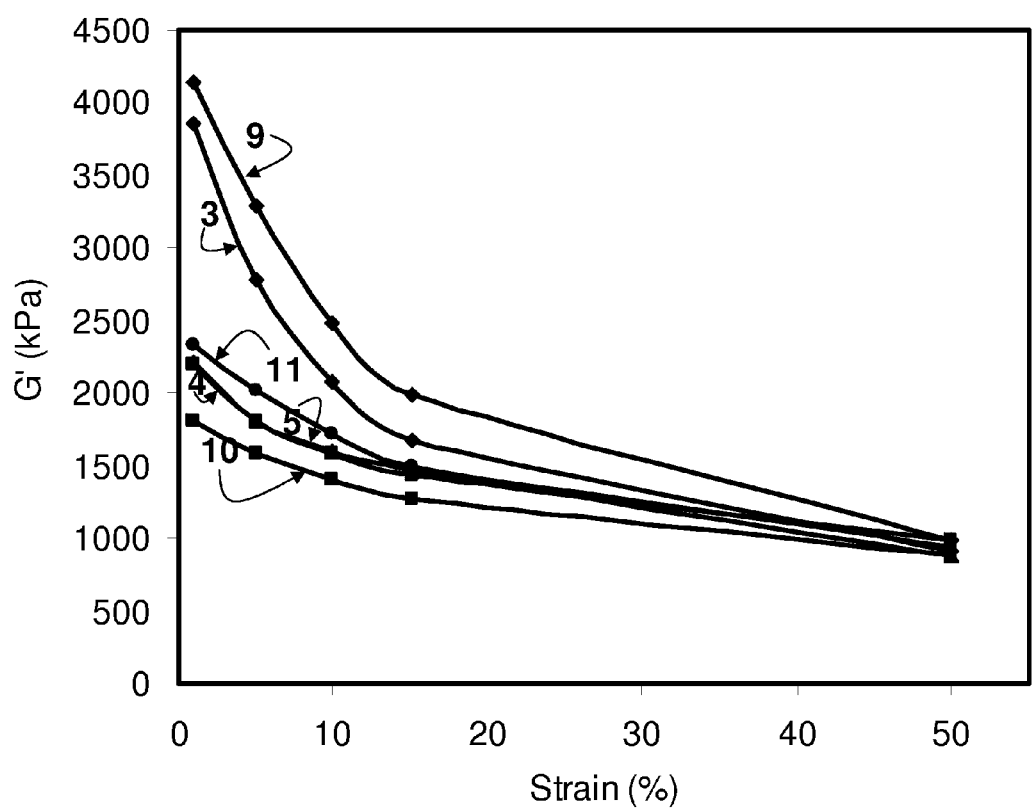
FIG. 4 shows a graph of G' versus percent strain for several rubber samples.
Figure 5:
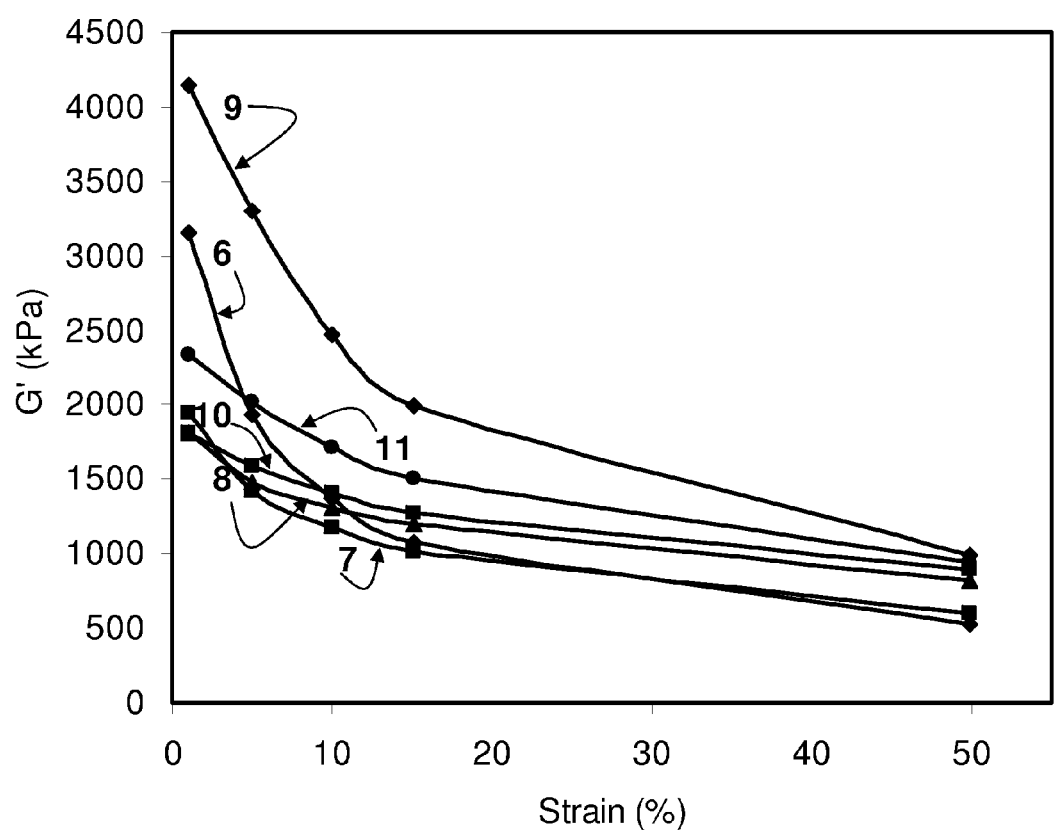
FIG. 5 shows a graph of G' versus percent strain for several rubber samples.

[1]silica pretreated with tetrafurfuryl orthosilicate according to Example 2
[2]silica pretreated with 2,2'-spirobi[4H-1,2,3-benzodioxasiline] according to Example 2
[3]triethoxysilylpropyl disulfide FIGS. 4 and 5 indicate an increase in polymer filler interaction for samples with pretreated silica as compared with control, untreated silica. In particular, a reduced Payne effect is observed for sample 6 as compared with sample 9, and for sample 3 as compared with sample 9. This is seen by comparing the G' 50%/G' 1% ratio, which indicates the degree of the strain dependence of the dynamic storage modulus. The Payne effect is the nonlinear dynamic mechanical property of elastomers in the presence of filler first studied by Payne, Appl. Polym. Sci., 6, 57 (1962). It is generally associated with the breakdown and agglomeration of filler particles. Filler-matrix interactions are also thought to be contributing factors to the Payne effect. Such processes are the slippage of entanglements between bound rubber and the mobile rubber phase, molecular surface slippage or rearrangement and release of trapped rubber within the filler network. The magnitude of strain dependence of dynamic moduli increases with decreasing molecular weight and strongly reduced by increasing polymer-filler interaction, i.e., by the use of coupling agents. See, e.g., G. Heinrich et al., Advances in Polymer Science, 160, 1436-5030 (2002); S. S. Sternstein et al., Macromolecules, 35, 7262-7273 (2002); Ai-Jun Zhu et al., Composite Science and Technology, 63, 1113-1126 (2003); J. D. Ulmer et al., Rubber Chem. & Techn., 71(4), 637-667 (1998); C. Gauthier et al., Polymer, 45, 2761-2771 (2003). Therefore measurement of Payne effect is highly suitable to quantify polymer-filler interactions. Again referring to the data of FIGS. 4 and 5, it is seen that the G' 50%/G' 1% ratio for sample 3 is lower that for sample 9, and also G' 50%/G' 1% ratio for sample 6 is lower that for sample 9, indicating a lower strain dependence of the dynamic modulus due to superior polymer-filler interaction for samples 3 and 6.

Example 4

In this example, the in situ reaction of a silyl ether in a rubber compound in the presence of silica is illustrated. A series of eight rubber compounds was prepared following the compositions given in Table 3, with all amounts in phr. Other additives were used in identical amounts including process oil, 20 phr; stearic acid, 2 phr; zinc oxide, 3.5 phr; N-cyclohexyl-2-benzothiazole sulfenamide, 1.6 phr; diphenyl guanidine, 1.2; sulfur, 1.8 phr. The rubber compounds were evaluated for viscoelastic properties using an MDR 2000 at 150° C. following ASTM D2084 and D5289. Results for torque S' and dynamic modulus G' versus time are given in FIGS. 6 and 7.

TABLE 3

| Sample No. | 12 | 13 | 14 | 15 | 16 | 17 | 18 | 19 |
|---|---|---|---|---|---|---|---|---|
| Styrene-Butadiene Rubber | 70 | 70 | 70 | 70 | 70 | 70 | 70 | 70 |
| Polybutadiene Rubber | 30 | 30 | 30 | 30 | 30 | 30 | 30 | 30 |
| SBOS[4] | 5 | 5 | 0 | 0 | 0 | 6.5 | 6.5 | 0 |
| p-toluenesulfonic acid | 0.23 | 0.23 | 0 | 0.23 | 0.23 | 0.3 | 0.3 | 0 |
| Silica | 65 | 65 | 65 | 65 | 65 | 65 | 65 | 65 |
| Silane[5] | 3 | 3 | 5.2 | 5.2 | 5.2 | 0 | 0 | 0 |
| Non-Productive Mixing Plateau Temperature [° C.] | 160 | 120 | 160 | 120 | 160 | 120 | 160 | 160 |

[4]2,2'- spirobi[4H-1,2,3-benzodioxasiline]
[5]triethoxysilylpropyl disulfide

Figure 6:
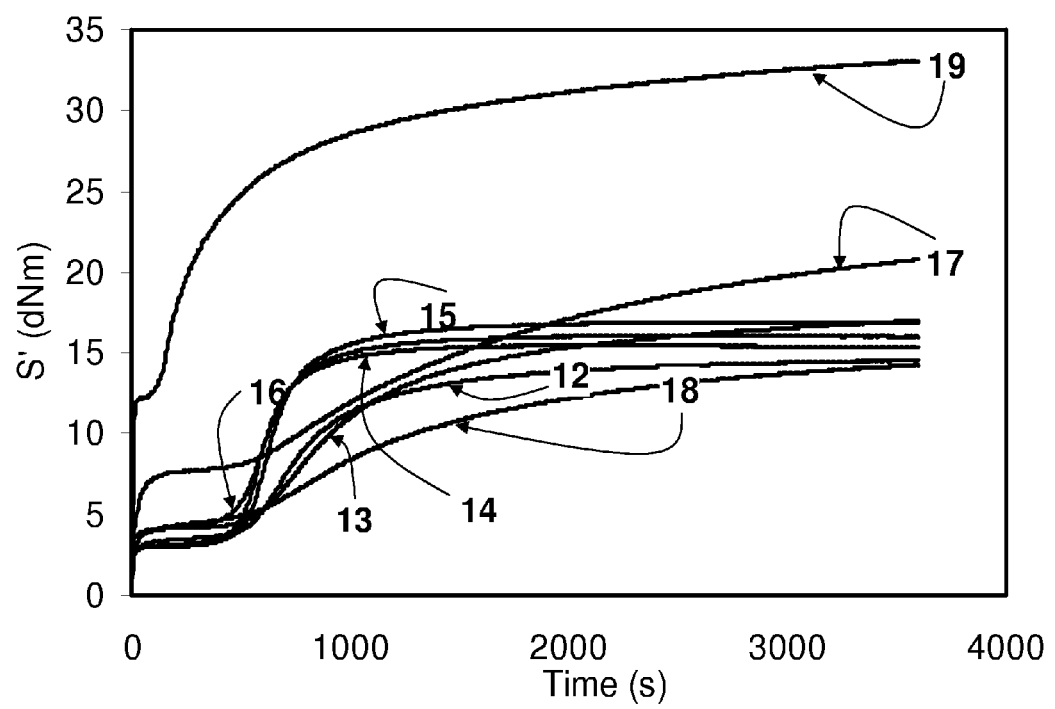
FIG. 6 shows a graph of torque versus cure time for several rubber samples.
Figure 7:
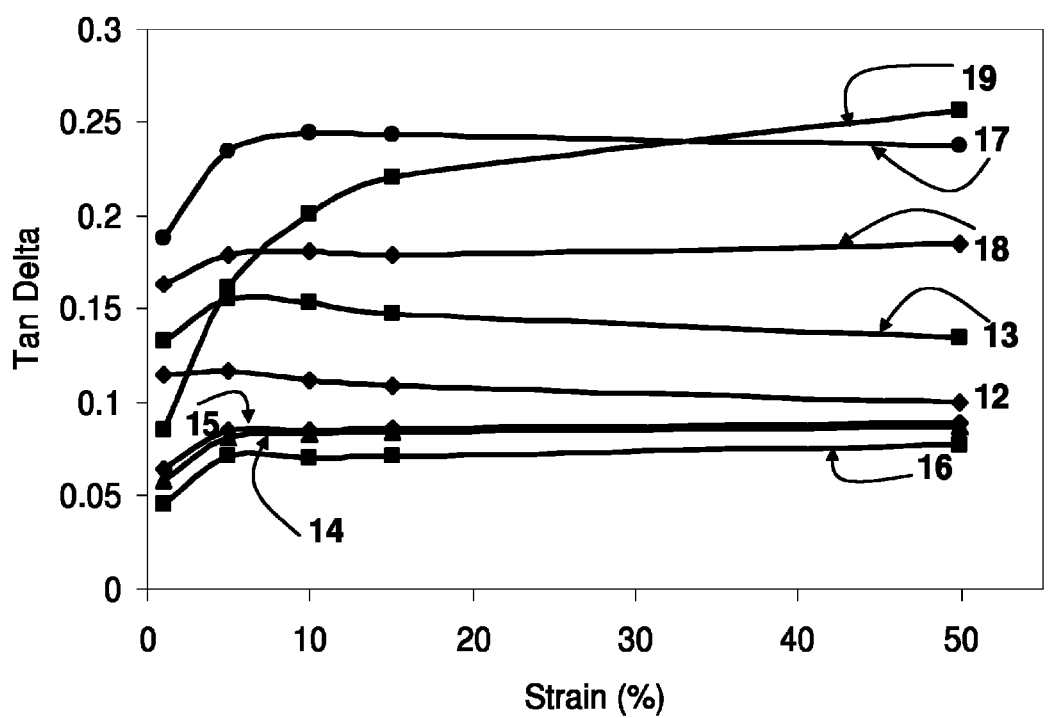
FIG. 7 shows a graph of tan delta versus percent strain for several rubber samples.

The MDR curves in FIGS. 6 and 7 show that SBOS leads to a reduction of filler-filler interactions. This can be concluded from the reduced silica flocculation during the first seconds of the MDR measurement. Sample 18 (SBOS mixed at 160° C.) shows almost no flocculation behavior. Thus, when compared to silica without coupling agent (sample 19), a clear positive influence of the SBOS is observed. In addition, FIG. 7 shows that the RPA tan delta values at high strains are lower for SBOS than for silica without coupler.

Example 5

Figure 8:
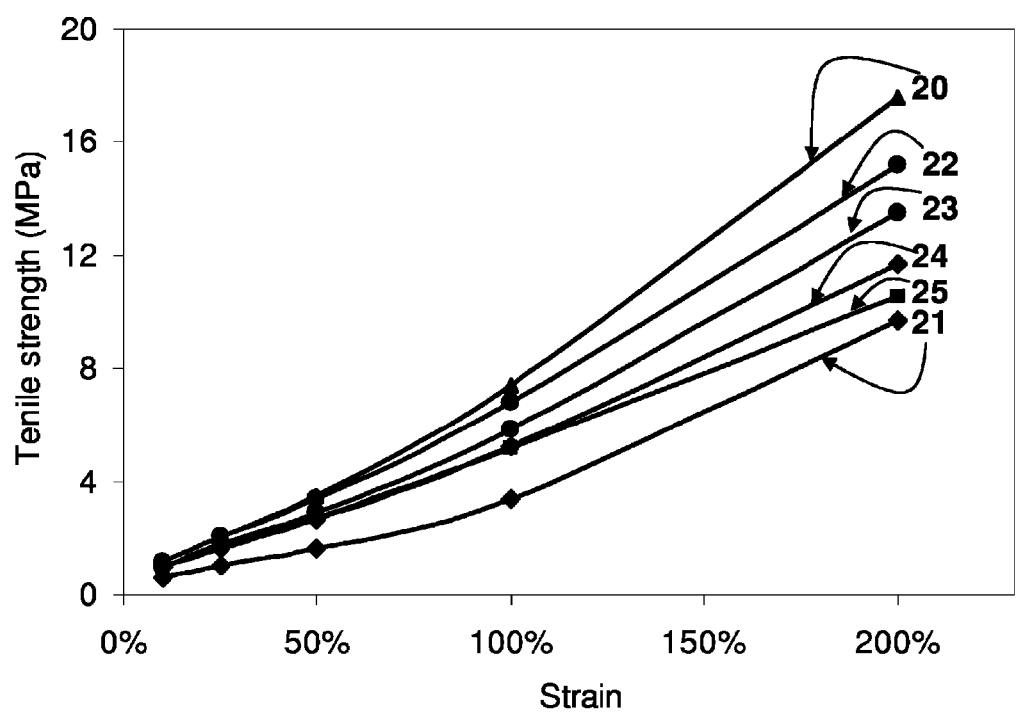
FIG. 8 shows a graph of tensile stress versus percent strain for several rubber samples.

In this example, the in situ reaction of a silyl ether in a rubber compound in the presence of carbon black is illustrated. A series of six rubber compounds was prepared following the compositions given in Table 4, with all amounts in phr. Other additives were used in identical amounts including stearic acid, 2 phr; zinc oxide, 3 phr; N-cyclohexyl-2-benzothiazole sulfenamide, 1.6 phr; sulfur, 1.6 phr. The rubber compounds were cured at 150° C. for 60 minutes and evaluated for tensile stress. Results are given in FIG. 8.

TABLE 4

| Sample No. | 20 | 21 | 22 | 23 | 24 | 25 |
|---|---|---|---|---|---|---|
| Styrene-Butadiene Rubber | 100 | 100 | 100 | 100 | 100 | 100 |
| TFOS | 0 | 0 | 5 | 10 | 15 | 20 |
| p-toluenesulfonic acid | 0 | 0 | 0.5 | 1 | 1.5 | 2 |
| Carbon Black | 60 | 40 | 55 | 50 | 45 | 40 |

The comparison of the tensile curves (FIG. 8) of sample 21 (40 phr CB) and sample 25 (40 phr black and 20 phr TFOS) shows that some additional reinforcement is achieved by the structure generated from the reaction product of the TFOS.

What is claimed is:

1. A pneumatic tire comprising a component, the component comprising a rubber composition comprising a diene based elastomer and 1 to 100 phr of:

A) a twin polymerization reaction product of a silyl ether, wherein the silyl ethers are of the following structures I or II:

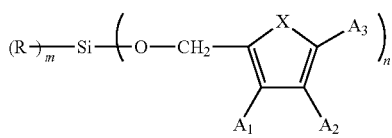

I wherein m=0, 1, or 2; n=4-m; R=aliphatic or heteroaliphatic moieties (alkyl, alkoxy etc.); X=oxygen or sulfur; A1, A2, A3=independently from each other H, or alkyl;

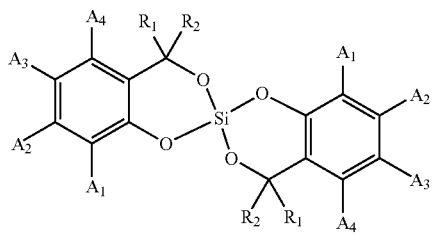

II wherein R1, R2=independently from each other hydrogen, alkyl up to 6 carbons; A1, A2, A3, A4=independently from each other hydrogen, unbranched or branched aliphatic hydrocarbons, aromatic hydrocarbons or aromatic-aliphatic hydrocarbons; or
  B) a twin polymerization reaction product of a boronic acid esters as shown in formula V:

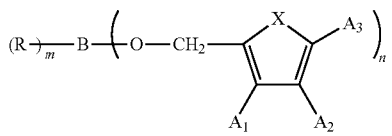

V wherein m=0 or 1; n=3-m; R=aliphatic or heteroaliphatic moieties (alkyl, alkoxy etc.); X=oxygen or sulfur; A1, A2, A3=independently from each other H, alkyl; or
  C) a twin polymerization reaction product of a titanium compound derived from tetraethyl orthotitanate and furfuryl alcohol; or
  D) a twin polymerization reaction product of a tungsten compound derived from tungsten hexachloride and a member of the groups consisting of furfuryl acetate, thiophene-2-methanol, p-methoxybenzylalcohol or o-methoxybenzylalcohol.

2. The pneumatic tire of claim 1, the rubber composition further comprising from 10 to 150 phr of silica.

3. The pneumatic tire of claim 1, wherein the rubber composition further comprises from 1 to 30 phr of a filler selected from the group consisting of ultra high molecular weight polyethylene (UHMWPE), crosslinked particulate polymer gels, plasticized starch composite filler, cellulose, and short textile fibers.

4. The pneumatic tire of claim 1, wherein the rubber composition is in contact with a tire cord.

5. The pneumatic tire of claim 1, wherein the silyl ether is selected from the group consisting of silyl ether of furfuryl alcohol and silyl ether of 2-hydroxymethyl phenol.

6. The pneumatic tire of claim 1, wherein the silyl ether is tetrafurfuryl orthosilicate or 2,2'-spirobi[4H-1,2,3-benzodioxasiline].

7. The pneumatic tire of claim 1, wherein the silyl ether is selected from the group consisting of silyl ethers of the following structures III and IV:

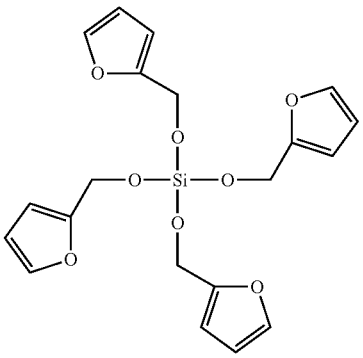

III

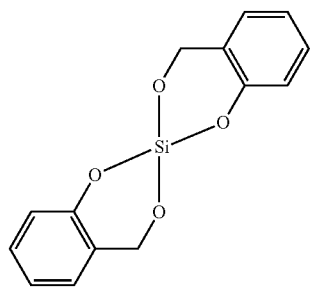

IV

8. The pneumatic tire of claim 1, wherein the rubber composition further comprises from 1 to 10 phr of at least one activated dienophile.

9. The pneumatic tire of claim 1, wherein the rubber composition further comprises from 1 to 10 phr of at least one member of the group consisting of bismaleimides and biscitraconimides.

10. The pneumatic tire of claim 1, wherein the rubber composition further comprises from 1 to 10 phr of at least one member of the group consisting of N,N'-(m-phenylene)bismaleimide and 1,3-bis(citraconimidomethyl)benzene.

11. The pneumatic tire of claim 1, wherein the rubber component is selected from the group consisting of a tread (including tread cap and tread base), carcass, sidewall, apex, chafer, sidewall insert, wirecoat and innerliner.

12. The pneumatic tire of claim 1, wherein the rubber component is a tread.

13. A rubber composition comprising a diene based elastomer and 1 to 100 phr of:
  A) a twin polymerization reaction product of a silyl ether, wherein the silyl ethers are of the following structures I or II:

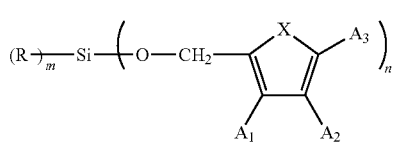

I wherein m=0, 1, or 2; n=4-m; R=aliphatic or heteroaliphatic moieties (alkyl, alkoxy etc.); X=oxygen or sulfur; A1, A2, A3=independently from each other H, or alkyl;

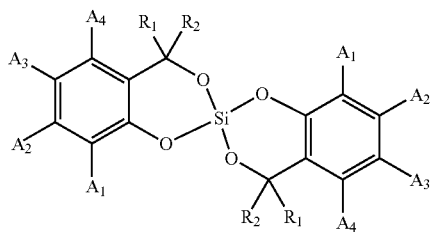

wherein R1, R2=independently from each other hydrogen, alkyl up to 6 carbons; A1, A2, A3, A4=independently from each other hydrogen, unbranched or branched aliphatic hydrocarbons, aromatic hydrocarbons or aromatic-aliphatic hydrocarbons; or B) a twin polymerization reaction product of a boronic acid esters as shown in formula V:

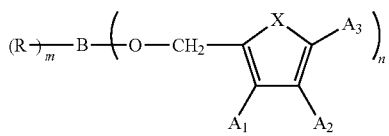

wherein m=0 or 1; n=3-m; R=aliphatic or heteroaliphatic moieties (alkyl, alkoxy etc.); X=oxygen or sulfur; A1, A2, A3=independently from each other H, alkyl; or C) a twin polymerization reaction product of a titanium compound derived from tetraethyl orthotitanate and furfuryl alcohol; or D) a twin polymerization reaction product of a tungsten compound derived from tungsten hexachloride and a member of the group consisting of furfuryl acetate, thiophene-2-methanol, p-methoxybenzylalcohol or o-methoxybenzylalcohol.

14. The rubber composition of claim 13, further comprising from 10 to 150 phr of silica.

15. The rubber composition of claim 13, further comprising from 1 to 30 phr of a filler selected from the group consisting of ultra high molecular weight polyethylene (UHMWPE), crosslinked particulate polymer gels, plasticized starch composite filler, cellulose, and short textile fibers.

16. The rubber composition of claim 13, wherein the silyl ether is selected from the group consisting of silyl ether of furfuryl alcohol and silyl ether of 2-hydroxymethyl phenol.

17. The rubber composition of claim 13, wherein the silyl ether is tetrafurfuryl orthosilicate or 2,2'-spirobi[4H-1,2,3-benzodioxasiline].

18. The rubber composition of claim 13, wherein the silyl ether is selected from the group consisting of silyl ethers of the following structures III and IV:

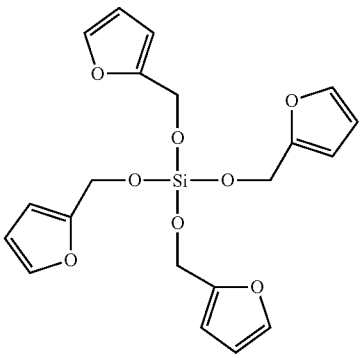

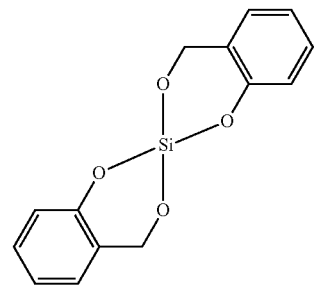

19. The rubber composition of claim 13, wherein the rubber composition further comprises from 1 to 10 phr of at least one activated dienophile.

20. The rubber composition of claim 13, wherein the rubber composition further comprises from 1 to 10 phr of at least one member of the group consisting of bismaleimides and biscitraconimides.

* * * * *